US012694363B2

(12) United States Patent
Burris et al.

(10) Patent No.: US 12,694,363 B2
(45) Date of Patent: *Jul. 28, 2026

(54) AUTONOMOUS DELIVERY

(71) Applicant: NCR Voyix Corporation, Atlanta, GA (US)

(72) Inventors: Matthew Robert Burris, Lawrenceville, GA (US); Jodessiah Sumpter, Alpharetta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/787,096

(22) Filed: Jul. 29, 2024

(65) Prior Publication Data

US 2025/0053915 A1     Feb. 13, 2025

Related U.S. Application Data

(63) Continuation of application No. 16/413,856, filed on May 16, 2019, now Pat. No. 12,051,032.

(51) Int. Cl.
*G06Q 10/083*          (2024.01)
*G06Q 10/0832*        (2023.01)
(Continued)

(52) U.S. Cl.
CPC ...  *G06Q 10/0832* (2013.01); *G06Q 10/08355* (2013.01); *G06Q 20/40145* (2013.01); *G06V 40/172* (2022.01); *G07F 15/001* (2013.01)

(58) Field of Classification Search
CPC .. G06Q 10/083; G06Q 10/0833; G06Q 10/08; G06Q 50/28; G06Q 10/087;
(Continued)

(56) References Cited

U.S. PATENT DOCUMENTS

2012/0084222 A1*  4/2012  Zimberoff ............ G06Q 10/083
                                                                  705/330
2015/0046298 A1*  2/2015  Zwakhals  ............ G06Q 10/087
                                                                  705/28

(Continued)

OTHER PUBLICATIONS

Bidiwala, "The Gas Station's Digital Future is Around the Corner", Sep. 17, 2017 (via Wayback Machine), https://web.archive.org/web/20170917125335/https://www.oliverwyman.com/content/dam/oliver-wyman/v2/publications/2017/may/Gas_Station_Digital_Future.pdf (Year: 2017).*

(Continued)

*Primary Examiner* — Michael P Harrington
(74) *Attorney, Agent, or Firm* — Schwegman Lundberg & Woessner, P.A.

(57)          ABSTRACT

A pre-staged or in-person provided order is received from a customer location. Order details are sent to a fulfillment terminal and items associated with the order are prepared or collected. The items are loaded into an autonomous device. The autonomous device plans a route from its current location to the customer location and the autonomous device navigates from its current location to the customer location using the route. The customer is verified at the autonomous device and a secure bin is unlocked by the autonomous device. The customer removes the items associated with the order from the unlocked secure bin, and the autonomous device navigates back to its original location within an enterprise.

20 Claims, 5 Drawing Sheets

(51) Int. Cl.
G06Q 20/40 (2012.01)
G06V 40/16 (2022.01)
G07F 15/00 (2006.01)
(58) Field of Classification Search
CPC ......... G06Q 10/0832; G06Q 10/08355; G06Q 30/0633; G06Q 10/0837
See application file for complete search history.

(56) References Cited

U.S. PATENT DOCUMENTS

| | | | |
|---|---|---|---|
| 2015/0221021 A1* | 8/2015 | Shakes | G06Q 10/08 |
| | | | 705/26.81 |
| 2017/0228690 A1* | 8/2017 | Kohli | G06Q 20/10 |
| 2017/0286892 A1* | 10/2017 | Studnicka | G06Q 20/3224 |
| 2018/0246526 A1* | 8/2018 | Wilkinson | G05D 1/0278 |
| 2018/0257777 A1* | 9/2018 | Lesser | G06Q 10/0833 |
| 2019/0034868 A1* | 1/2019 | Konanur | G06Q 10/0832 |
| 2019/0228375 A1* | 7/2019 | Laury | G05D 1/0088 |

OTHER PUBLICATIONS

V. Gatteschi et al., "New Frontiers of Delivery Services Using Drones: a Prototype System Exploiting a Quadcopter for Autonomous Drug Shipments," 2015 IEEE 39th Annual Computer Software and Applications Conference, Taichung, Taiwan, 2015, pp. 920-927, doi: 10.1109/COMPSAC.2015.52 (Year: 2015).*

* cited by examiner

200

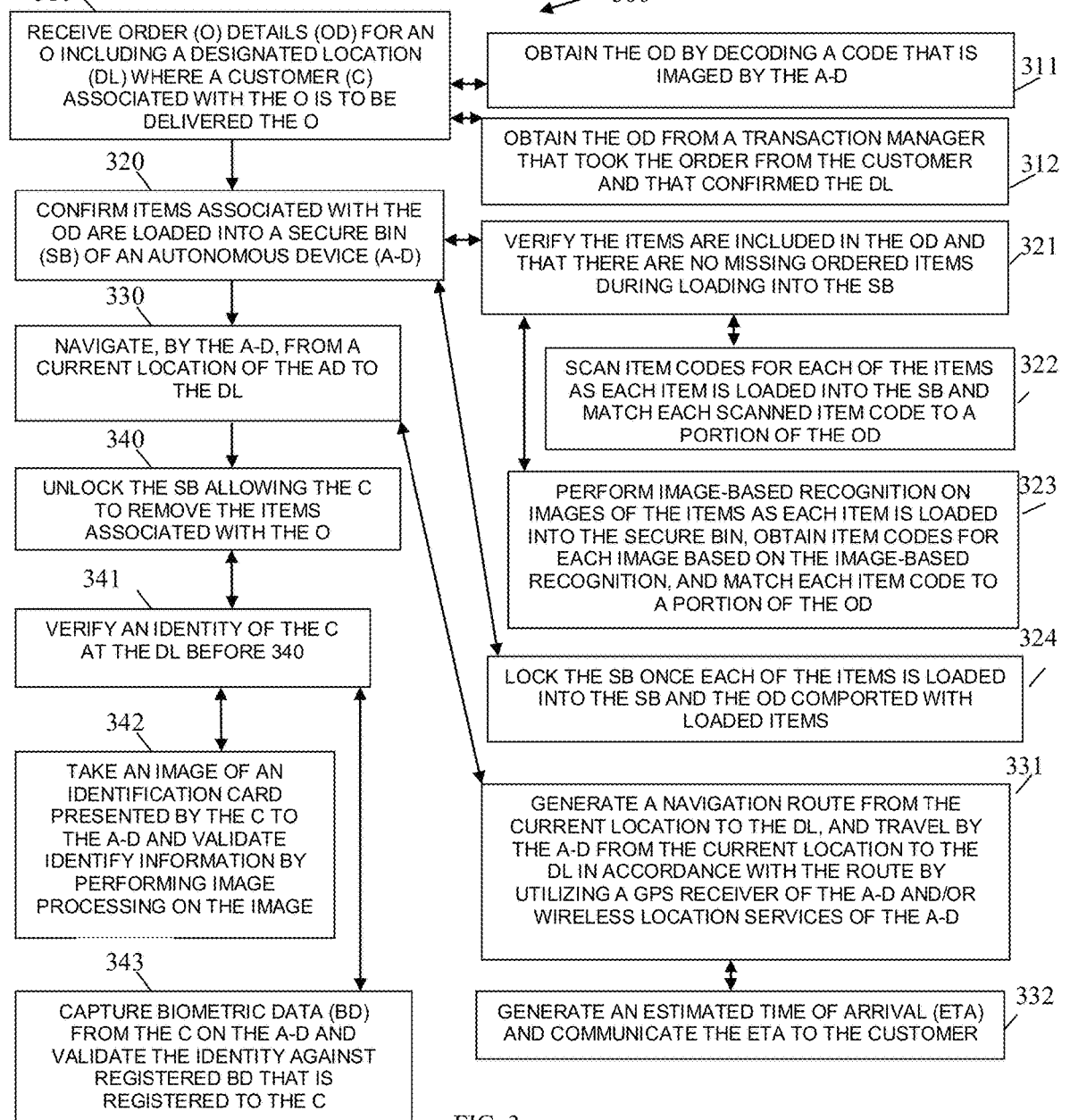

310

RECEIVE ORDER (O) DETAILS (OD) FOR AN O INCLUDING A DESIGNATED LOCATION (DL) WHERE A CUSTOMER (C) ASSOCIATED WITH THE O IS TO BE DELIVERED THE O

300

OBTAIN THE OD BY DECODING A CODE THAT IS IMAGED BY THE A-D    311

OBTAIN THE OD FROM A TRANSACTION MANAGER THAT TOOK THE ORDER FROM THE CUSTOMER AND THAT CONFIRMED THE DL    312

320

CONFIRM ITEMS ASSOCIATED WITH THE OD ARE LOADED INTO A SECURE BIN (SB) OF AN AUTONOMOUS DEVICE (A-D)

VERIFY THE ITEMS ARE INCLUDED IN THE OD AND THAT THERE ARE NO MISSING ORDERED ITEMS DURING LOADING INTO THE SB    321

330

NAVIGATE, BY THE A-D, FROM A CURRENT LOCATION OF THE AD TO THE DL

SCAN ITEM CODES FOR EACH OF THE ITEMS AS EACH ITEM IS LOADED INTO THE SB AND MATCH EACH SCANNED ITEM CODE TO A PORTION OF THE OD    322

340

UNLOCK THE SB ALLOWING THE C TO REMOVE THE ITEMS ASSOCIATED WITH THE O

PERFORM IMAGE-BASED RECOGNITION ON IMAGES OF THE ITEMS AS EACH ITEM IS LOADED INTO THE SECURE BIN, OBTAIN ITEM CODES FOR EACH IMAGE BASED ON THE IMAGE-BASED RECOGNITION, AND MATCH EACH ITEM CODE TO A PORTION OF THE OD    323

341

VERIFY AN IDENTITY OF THE C AT THE DL BEFORE 340

324

LOCK THE SB ONCE EACH OF THE ITEMS IS LOADED INTO THE SB AND THE OD COMPORTED WITH LOADED ITEMS

342

TAKE AN IMAGE OF AN IDENTIFICATION CARD PRESENTED BY THE C TO THE A-D AND VALIDATE IDENTIFY INFORMATION BY PERFORMING IMAGE PROCESSING ON THE IMAGE

331

GENERATE A NAVIGATION ROUTE FROM THE CURRENT LOCATION TO THE DL, AND TRAVEL BY THE A-D FROM THE CURRENT LOCATION TO THE DL IN ACCORDANCE WITH THE ROUTE BY UTILIZING A GPS RECEIVER OF THE A-D AND/OR WIRELESS LOCATION SERVICES OF THE A-D

343

CAPTURE BIOMETRIC DATA (BD) FROM THE C ON THE A-D AND VALIDATE THE IDENTITY AGAINST REGISTERED BD THAT IS REGISTERED TO THE C

332

GENERATE AN ESTIMATED TIME OF ARRIVAL (ETA) AND COMMUNICATE THE ETA TO THE CUSTOMER

FIG. 3

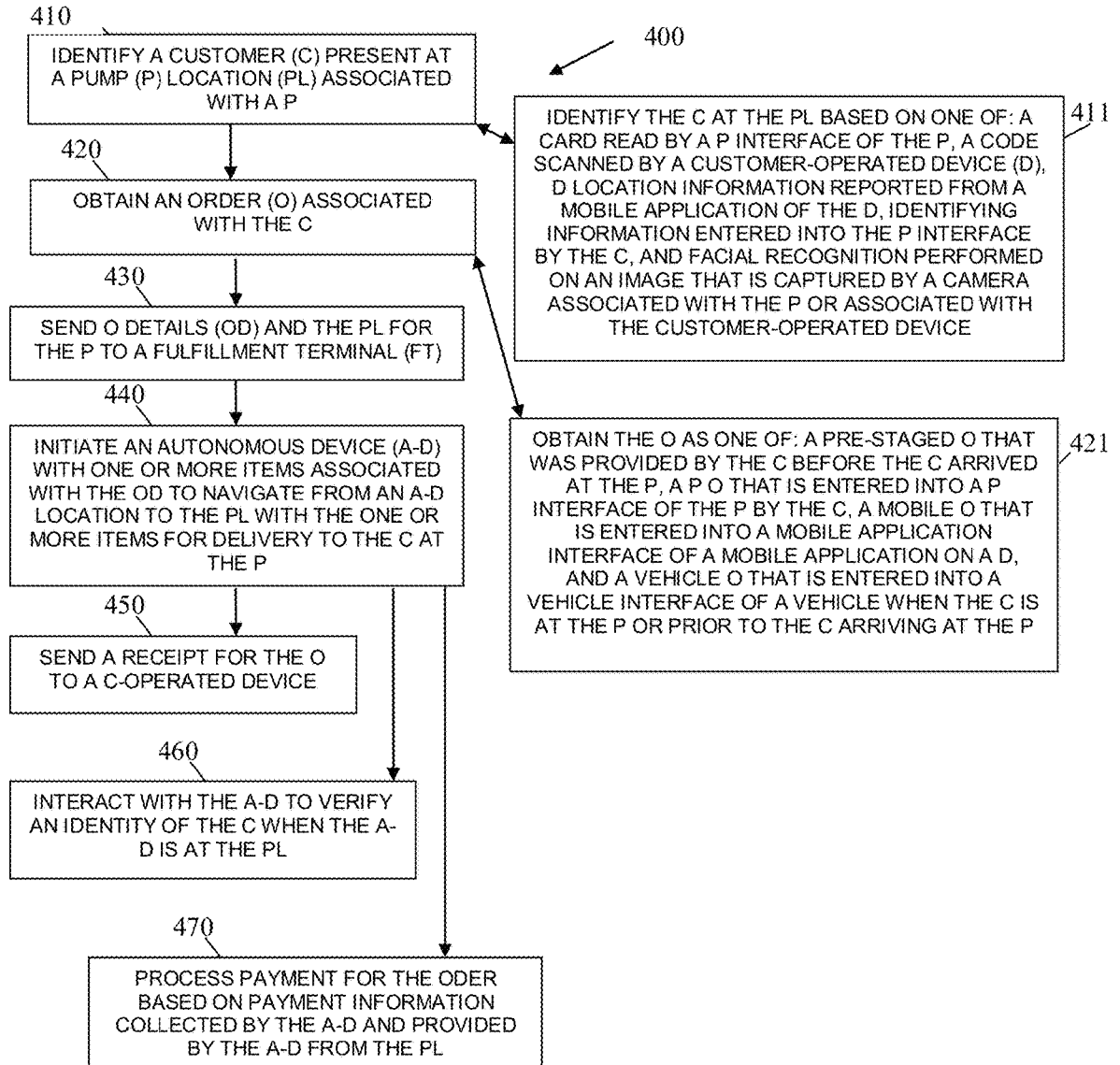

410

IDENTIFY A CUSTOMER (C) PRESENT AT A PUMP (P) LOCATION (PL) ASSOCIATED WITH A P

400

411

IDENTIFY THE C AT THE PL BASED ON ONE OF: A CARD READ BY A P INTERFACE OF THE P, A CODE SCANNED BY A CUSTOMER-OPERATED DEVICE (D), D LOCATION INFORMATION REPORTED FROM A MOBILE APPLICATION OF THE D, IDENTIFYING INFORMATION ENTERED INTO THE P INTERFACE BY THE C, AND FACIAL RECOGNITION PERFORMED ON AN IMAGE THAT IS CAPTURED BY A CAMERA ASSOCIATED WITH THE P OR ASSOCIATED WITH THE CUSTOMER-OPERATED DEVICE

420

OBTAIN AN ORDER (O) ASSOCIATED WITH THE C

430

SEND O DETAILS (OD) AND THE PL FOR THE P TO A FULFILLMENT TERMINAL (FT)

440

INITIATE AN AUTONOMOUS DEVICE (A-D) WITH ONE OR MORE ITEMS ASSOCIATED WITH THE OD TO NAVIGATE FROM AN A-D LOCATION TO THE PL WITH THE ONE OR MORE ITEMS FOR DELIVERY TO THE C AT THE P

421

OBTAIN THE O AS ONE OF: A PRE-STAGED O THAT WAS PROVIDED BY THE C BEFORE THE C ARRIVED AT THE P, A P O THAT IS ENTERED INTO A P INTERFACE OF THE P BY THE C, A MOBILE O THAT IS ENTERED INTO A MOBILE APPLICATION INTERFACE OF A MOBILE APPLICATION ON A D, AND A VEHICLE O THAT IS ENTERED INTO A VEHICLE INTERFACE OF A VEHICLE WHEN THE C IS AT THE P OR PRIOR TO THE C ARRIVING AT THE P

450

SEND A RECEIPT FOR THE O TO A C-OPERATED DEVICE

460

INTERACT WITH THE A-D TO VERIFY AN IDENTITY OF THE C WHEN THE A-D IS AT THE PL

470

PROCESS PAYMENT FOR THE ODER BASED ON PAYMENT INFORMATION COLLECTED BY THE A-D AND PROVIDED BY THE A-D FROM THE PL

FIG. 4

AUTONOMOUS DELIVERY

CROSS-REFERENCE TO RELATED APPLICATION

This application is a continuation of U.S. patent application Ser. No. 16/413,856, filed May 16, 2019, which application and publication is incorporated herein by reference in its entirety.

BACKGROUND

Technology is substantially integrated into businesses and the everyday life of consumers. Businesses have added technology support to transacting with their consumers over a variety of communication channels, some of which include consumer-operated devices.

Typically, the transactions are either based on the consumer being at a kiosk or Point-of-Sale (POS) terminal or the consumer transacting from home over a web-based interface to the businesses. That is, either the consumer physically picks up the items from a designated location of the business or the consumer waits for a delivery from a delivery service.

However, in some environments, such as purchasing fuel, the consumer usually has to transact at the pump and wait for his/her tank to be filled, then leave the vehicle, enter the store, and make a purchase at a POS terminal with a cashier. This leaves the pump lanes occupied while the consumer is purchasing something inside the store preventing other customers from accessing the pump. Furthermore, it is extremely inconvenient for the consumer to move the vehicle to a new location on the premises for making an in-store purchase. The lots are usually not very spacious and maneuvering it difficult, particularly when the store and pumps are busy.

As a result, consumers that typically would make a purchase within the store are less likely to do so. Business estimate that a substantial amount of loss sales occurs when consumers are refueling. In fact, in a majority of cases, it is more likely the purchasers at the store are not also refueling their vehicles; rather, consumers come into the store to purchase specific snacks, drinks, lottery tickets, and the like.

SUMMARY

In various embodiments, methods and a system for autonomous delivery of items on premises of locations of the consumers.

According to an embodiment, a method for autonomous item delivery is presented. An autonomous device receives order details for an order including a customer location where a customer associated with the order is located. The autonomous device confirms items associated with the order details are loaded into a secure bin of the autonomous device and navigates from a current location of the autonomous device to the customer location. The autonomous device unlocks the secure bin allowing the customer to remove the items associated with the order.

BRIEF DESCRIPTION OF THE DRAWINGS

FIG. 3 is a diagram of a method for autonomous item delivery, according to an example embodiment.
FIG. 4 is a diagram of another method for autonomous item delivery, according to an example embodiment.

DETAILED DESCRIPTION

Figure 1:
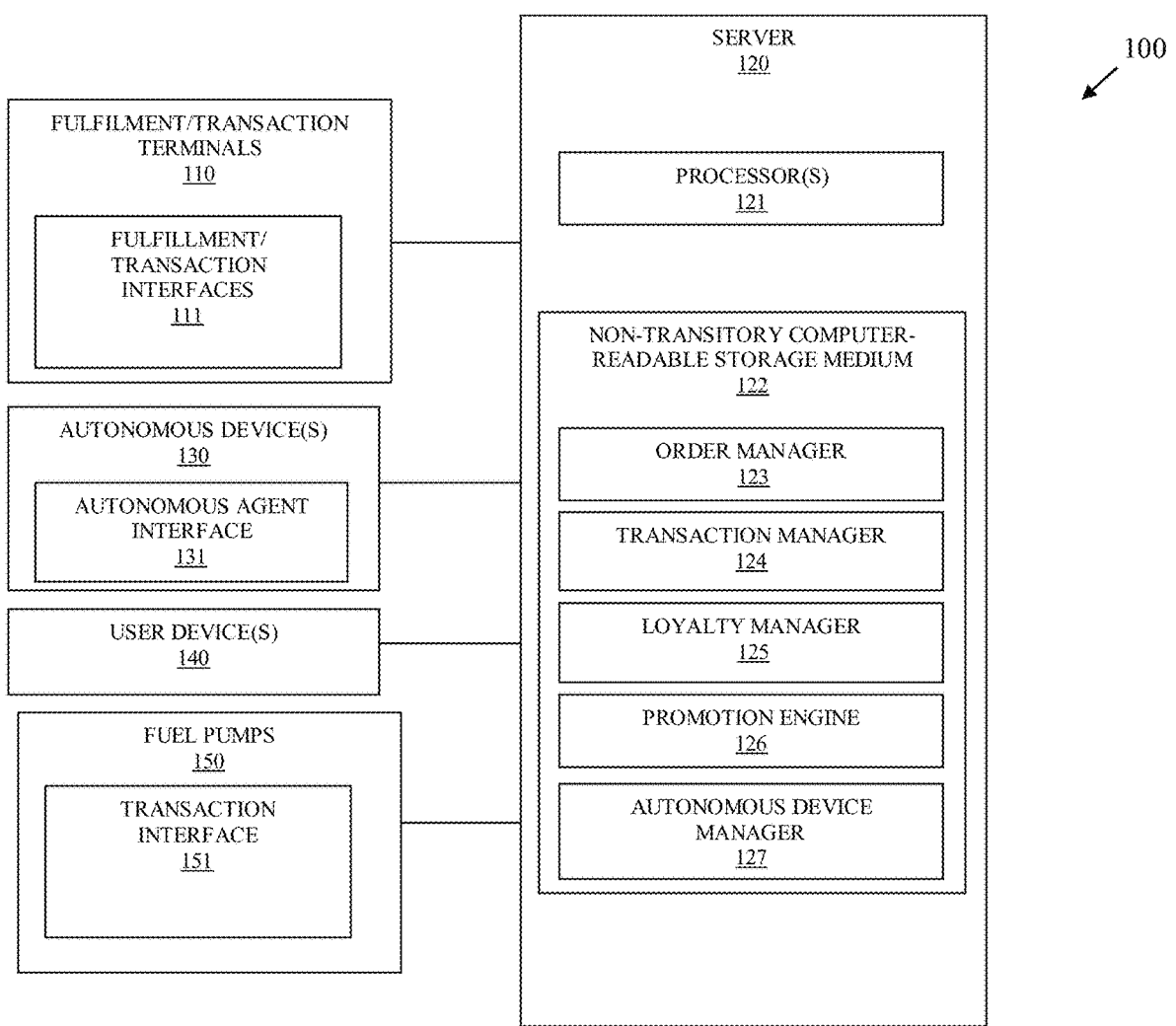
FIG. 1 is a diagram of a system for autonomous item delivery, according to an example embodiment.

FIG. 1 is a diagram of a system 100 for autonomous item delivery, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of autonomous item delivery, presented herein and below.

As used herein and below, the terms "user," "consumer," and "customer" may be used interchangeably and synonymously. The terms refer to an individual placing an order for delivery associated with a location of that individual.

System 100 includes a plurality of processing devices and device types 110-150. The system 100 includes a server 120, fulfillment/transaction terminals 110, autonomous devices 130, user operated devices 140, and fuel pump/transaction terminals 150. Server 120 includes executable instructions that execute on one or more hardware processors 121 of server 120 from a non-transitory computer-readable storage medium 122 as: order manager 123, transaction manager 124, loyalty manager 125, promotion engine 126, and an autonomous device manager 127.

It is to be noted that there may be multiple servers 120, such that the different elements 123-127 may execute on a same server 120 or multiple different servers 120 networked together. Furthermore, the server 120 may be a Local Area Network (LAN)-based server 120 or a Wide-Area Network (WAN)-based server 120.

In an embodiment, the server 120 is part of a cloud-processing environment that includes a plurality of servers logically cooperating of a network as a single accessible server 120.

The components of the system 120 permit customer-based ordering of items (food or non-food) while the customer is operating the fuel pump 150 for purposes of refueling a vehicle of the customer. The order can be placed in a variety of manners and may even be pre-staged before the customer arrives at the fuel pump.

For example, a mobile application that executes on the user-operated device 140 (such as a phone, tablet, or wearable processing device) may include a user-interface that permits the customer to provide an order before coming to the pump 150. Once at the pump 150, the transaction manager 124 can be notified in a variety of manners. For instance, the mobile application may report location information for the user-operated device 140 to the transaction manager 124 and a determination is made the customer is at the pump 150. The pump 150 through the fuel interface 151 may also report that the customer is at the pump at the start of a transaction in which the customer inserts a payment card into a card reader, the customer identifier on the card is sent to the transaction manager 124, the transaction manager 124 access a list of pre-stated transactions and identifies the customer's identifier and checks the customer in. In still another case, a Quick Response (QR) code located on the pump 150 or adjacent to the pump when scanned by the user-device 140 sends a pump identifier and the customer identifier to the transaction manager 124 for customer check-in on a pre-staged transaction.

The customer may also decide to place an order once the customer is at the pump 150 for refueling and decides that an item is desired from inside the convenience store associated with the pump 150. Here, the mobile application on the user device 140 or the transaction/fuel interface 151 of the pump 150 may take the order.

The order once received is routed through the transaction manager 124. If the order was pre-staged, the order's location is identified in a staging area of the convenience store. If the order is being placed at the time of refueling, the transaction manager 124 sends the order with item detail to the order manager 123. The order manager 123 sends messages and instructions that include the customers current pump location (pump number), customer name, and items requested for the order. The fulfillment/transaction terminals 110 include displays that display the order details to staff and prints a label that identifies the items from within the store. The staff bags the items from the store in accordance with the label and returns them back to a staging area of the store. The label may include a QR code that identifies the customer pump number, customer name, and items that are to be associated with the order. An autonomous device 130 is then loaded with the item and scans the label, as items are located into a secure bin associated with the autonomous device 130, the autonomous device 130 scans each item and matches that it was identified in the QR code original scanned by the autonomous device. This allows for detecting when an item is missing, if the quantity of the items are wrong, or if wrong items are being loaded into the secure bin of the autonomous device 130.

Once the QR code from the label is scanned into the autonomous device 130, the autonomous device plans a route from the staging/loading area to the pump where the consumer is presently located and calculates an estimated time of arrival (ETA). The autonomous device 130 then sends a text message or an application message to the mobile application of the user device 140 and/or to the transaction/fuel interface 151 so that the customer is aware of when the items for the order will arrive at the customer's pump location.

In another case, the order, customer information (mobile device identifier and/or customer name/identifier), and current pump location may be sent from autonomous device manager 127 to the autonomous agent interface 131. The autonomous device 140 then scans the label as a verification process from what was already provided by autonomous device manager 127.

Similarly, when orders arrive at the staging area, the fulfillment terminal 110 may be used to send a notification directly to the autonomous agent interface 131.

The autonomous device 130 is either a robot or a flying drone that includes a secure bin that is locked once loaded by the staff. The autonomous device 130 may also be equipped with a variety of biometric-based devices (cameras, fingerprint reader, retina scanner, etc.) for purposes of biometrically verifying the customer before unlocking the secure bin for customer retrieval of the items at the pump. Still further, the autonomous device 130 may be equipped with a payment card reader (non-contact-based and/or contact based) and/or a barcode scanner (which can be the camera discussed above or a separate dedicated scanner). In an embodiment, the autonomous device 130 may also include a ticket reader for which the label is inserted and the barcode/QR code is read during item loading. Furthermore, the camera of the autonomous device 130 may be used to perform image based recognition on the items inserted into the secure bin during item load, such that a scanner may be unnecessary to perform individual item verification during item load.

In instances where an item is being purchased with an order that requires age verification of the customer that placed the order, such as for alcohol, tobacco, or lottery tickets, the autonomous device 130 uses at least a camera to take a picture of a government issued identification card when at the pump with the customer's order. The customer presented the identification card and the camera takes a picture and then compares against a face of the customer for verification. Either, the autonomous agent interface 131 performs optical character recognition on the details of the identification card or the autonomous agent interface 131 sends the image for verification of card details (age, name, identification card number, birthdate, etc.) to a remote verification service for the verification. In other instances, the customer may have pre-registered biometric features (facial, finger prints, retinal scan, etc.) and the biometric devices of the autonomous device 130 capture the customer's biometric features and match against the registered features for verification. Biometric verification may be best on a hash computed on predefined information captured from the consumer at the pump 150 and then compared against an expected hash value for the consumer's registered biometric features, such that the verification can be processed rapidly. If the autonomous device 130 is unable to verify the customer, the secure bin is not unlocked and the items are returned back to the staging area by the autonomous device 130.

The customer may pre-pay for the items, pay for the items separate from payment of fuel at the pump 150, or pay for the items on delivery through the autonomous device's contactless of contact-based card reader.

Once customer verification is made and payment is confirmed as having been received, the autonomous device 130 unlocks the bin, the customer takes the items out while at the pump, and shuts the bin. The autonomous device 130 then returns back to the staging area to process a next order.

In an embodiment, a mobile application of the user device 130 may report user device location information to transaction manager 124 and/or to the agent interface 131. In this way, the customer can move from the pump location to another location on the premises, such as a parking spot or inside the store at the restrooms. The agent interface 131 then dynamically reroutes itself to the then existing customer location. This permits movement by the customer without terminating the autonomous delivery of the autonomous device 130.

In an embodiment, the system 100 operates at entertainment or other venues besides a convenience store, the venues can be inside and/or outside. The customer can then operate kiosks 150 at the venues or mobile application of the user device 140 for purposes of placing an order and the order is delivered on the premises of the venue to the current existing location of the customer. Again, in some cases, the customer is free to move about the venue when the mobile application of user device 140 is reporting user-device location information for the user device 140.

In an embodiment, the current location of the autonomous device 130 is reported back to a mobile application of the user device 140. The mobile application superimposes a map of the venue marking the customer's current location and the moving location of the autonomous device 130 and displays the map with the locations on the display of the user device 140. This allows the customer to see in real time where the device 130 is currently at in relation to the customer's location.

In an embodiment, the autonomous device is a land-based robot.

In an embodiment, the autonomous device is an air-based drone.

There are several variations on how the system 100 can operate, some of which are discussed above and some of which are more completely discussed below with the other FIGS. 2-5.

Figure 2:
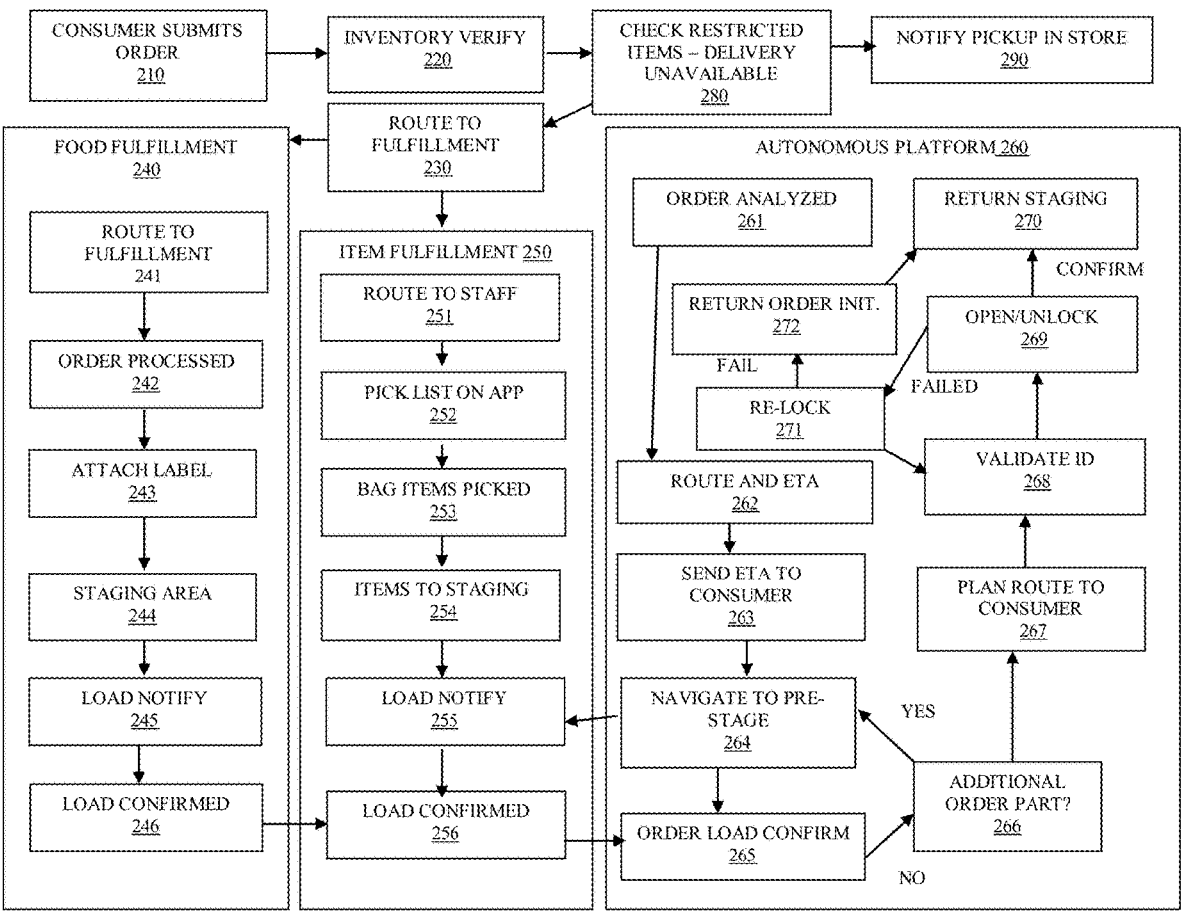
FIG. 2 is a diagram of processing associated with autonomous item delivery, according to an example embodiment.

FIG. 2 is a diagram of processing associated with autonomous item delivery of system 100, according to an example embodiment.

At 210, the transaction manager 124 receives a customer's order (pre-staged or while the customer is at the pump refueling) as discussed above through a mobile application on a user-operated device 140 and/or through the transaction/pump interface 151. The order is relayed to the order manager 123 and the order manager 123 sends it to the fulfillment/transaction terminal 110, as 220. At 230, the order manager 123 sends the order to the appropriate fulfillment terminals 110. That is, there may be a separate area for food fulfillment 240 for that which is associated with item fulfillment 250. Some of the order information may also be present to one of the autonomous devices 130 either by the transaction manager 124, the order manager 123, and/or the fulfillment terminals 110.

Food fulfillment 240 may include a variety of processing, such as routing the order to the appropriate terminals 110 of the individual that will prepare the food at 251. At 252, the food order is processed in accordance with the order. The food order label is printed off at 253, which again may include a QR code that identifies the customer, the pump number or pump location of the customer that placed the order, maybe a mobile device identifier for the user device of the customer, and identifiers for the food including ingredients, etc. The food ingredients, components, and handling instructions along with the customer number may also be printed in text on the label for customer reading upon receipt of the food order.

Once the food order is fully prepared and wrapped or packaged, the label is scanned and placed in a staging area at 254. Other staff or the same staff are then notified to load the food items for the order into one of the autonomous devices 130, at 255. Once the staff loads the order with the label into the secure bin of the autonomous device 130, a load confirmation is sent to activate the autonomous device 130 for delivery at 256.

The item order fulfillment 250 occurs in a similar manner to that which was discussed with the food fulfillment at 240. The order manager 123 sends an order with customer details (customer name, customer pump number or pump location, maybe customer use-defined number, etc.) to an item fulfillment terminal 110 associated with item order fulfillment 250. This is routed to the appropriate staff at 251. The item listed is printed on a label and sent to fulfillment terminals 130 that are mobile devices of the item pickers within the store, at 252. At 253, the staff picks the items and bags them while picking. At 254, the staff delivers the items for the order to the staging area. A notice is sent to load the items at 254, and the items are loaded into the secure bin and confirmed loaded at 255, which activates delivery by the autonomous device 130.

The autonomous device platform 160 is activated for delivery once an item is confirmed loaded into a secure bin of the autonomous device 130. The order information is verified or analyzed at 261 by the autonomous device 130. Again, this can be done via the QR code on the labels, through individual item scanning as items were loaded into the autonomous device 130, and/or through image-based item recognition performed by a camera of the autonomous device 130. The camera of the autonomous device 130 is used for capturing and decoding the item information and matching it to the order of the customer.

At 262, the autonomous device 130 generates a navigational map from the staging area to the pump where the customer is located and awaiting the order. At 262, the autonomous device 130 also calculates an ETA. At 263, the autonomous device sends or causes to be sent the ETA and order details to the user device 140 and/or the fuel interface 151. This can be done through a direct wireless sending of messages to those devices 140 and/or 150, or this can be done through the autonomous device 130 sending it indirectly through wireless communications back to the transaction manager 124, where the transaction manager 124 then sends directed to the devices 140 and/or 150.

At 264, the autonomous device 130 navigates to the staging area and notifies the staff to load the order if the order was not previously loaded as was discussed above.

At 265, the order is confirmed has having been loaded into the autonomous device 130.

At 266, a check is made to determine if there are still more items coming in cases where items are not completely accounted for with the order. Once confirmation is made that all items of the order are loaded into the secure bin of the autonomous device 130, at 267, the autonomous device 130 plans the route from its then current location to the pump number of pump location of the customer.

Once the autonomous device 130 is at the pump of the customer, the customer is requested to provide identification for the order through an identification card to a camera of the autonomous device 130, at 268. Image processing may be used to validate an age of the customer if that is needed for the customer to lawfully take possession of the order (such as when alcohol, tobacco, lottery tickets). This image of the card may also be recorded and sent to the transaction manager 124 for auditing and verification as may be required by regulations. As previously stated, the autonomous device 130 may also include biometric capture devices to capture biometric features, such as finger prints, retina scans, facial recognition, and the like when the customer has a registered biometric template within that customer's profile. Any biometric verification is then performed against the captured biometric features versus the registered biometric features.

Assuming, customer identification and/or any age verification is successful, the autonomous device 130 unlocks the secure bin and the customer removes the items along with the label, at 269. The autonomous delivery of the ordered items is confirmed and the autonomous device 130 returns back to the staging area or area where the autonomous devices are maintained, at 270. The items may include the previously discussed labels as a customer receipt for the items and/or the transaction manager 124 may send an electronic receipt to a registered user device 140 or send a customer receipt that is printed at the fuel pump 150 upon request of the customer through the transaction interface 151.

If customer verification is unable to be achieved, at 271, a failure is noted and the autonomous device 130 notifies the transaction manager 124 of any refund that may be needed to the customer if the customer had pre-paid, and the autonomous device 130 returns the items back to the staging area or some other designated area of the store that handles returned items.

At 280, the transaction manager 124 identifies restricted items that are too large or violate a law to deliver through an autonomous device 130. In such cases, at 290, the customer is notified through the user-define 140 or the fuel pump interface 151 (or both) that the item has to be picked up within the store and instructions on where to pick up such items is given to the customer in the notification.

The fulfillment/transaction terminals 110 can be a mixture of different types of devices, such as mobile devices, POS terminals, digital signs, and the like. The pickers or runners that fulfill items in the store may also have portable printers to print labels for the order, or these can be printed in the staging area from a network-based printer, or printed from the POS terminals.

The autonomous devices 130 can be preparing for an order before being loaded or can be prepared after an order is completely loaded. The autonomous devices 130 may be in a different location from the loading and staging area and be programmed to navigate from that area to the staging area with notification that a load is ready.

The autonomous devices 130 include a variety of sensors for auto-navigation around obstacles when in transit, such as motion sensors, light sensors, sound sensors, etc.

In an embodiment, the autonomous devices 130 live stream video as it is in transit back to one of the fulfillment/transaction terminals 110 or a designated management terminal. This allows personnel to view in real time what is happening during while the autonomous device is navigating to and from the customer's pump location. The autonomous devices 130 may also permit the personnel to speak through a speaker of the autonomous devices 130 to the customer or any other customer that may be interfering with the autonomous devices during transit.

In an embodiment, the autonomous device 130 is equipped with a variety of user interfaces for interacting with the customer, such as touch screen interfaces and voice interface. The voice interface may permit natural language interaction between the customer and the autonomous device 130.

These and other embodiments are now discussed with reference to the FIGS. 3-4.

FIG. 3 is a diagram of a method 300 for autonomous item delivery, according to an example embodiment. The software module(s) that implements the method 300 is referred to as an "autonomous delivery controller." The autonomous delivery controller is implemented as executable instructions programmed and residing within memory and/or a non-transitory computer-readable (processor-readable) storage medium and executed by one or more processors of a device. The processor(s) of the device that executes the autonomous delivery controller are specifically configured and programmed to process the autonomous delivery controller. The autonomous delivery controller may have access to one or more network connections during its processing. The network connections can be wired, wireless, or a combination of wired and wireless.

In an embodiment, the device that executes the autonomous delivery controller is the autonomous device 130. In an embodiment, the autonomous device 130 is fight-based drone. In an embodiment, the autonomous device is a land-based robot.

In an embodiment, the autonomous delivery controller autonomous device agent 131.

At 310, the autonomous delivery controller receives order details for an order. The order details including a designated location where a customer associated with the order is to be delivered the order while on a premises of an enterprise.

In an embodiment, the designated location is the current location of the customer that is placing an order or has previously placed a pre-staged order and is now situated at a fuel pump associated with a convenience store of the enterprise.

In an embodiment, the designated location changes as the customer travels about the premises based on mobile device location information dynamically reported by a mobile application of the mobile device to the autonomous delivery controller.

In an embodiment, the designated location is a location situated on the premises of the enterprise (inside or outside the enterprise) where the customer is instructed to pick up the order.

In an embodiment, at 311, the autonomous delivery controller obtains the order details by decoding a code that is imaged by the autonomous device 130. In an embodiment, the code is a barcode. In an embodiment, the code is a QR code. In an embodiment, the code is a string of digits and/or characters that is processed by the autonomous delivery controller to obtain the order details from a server-based location.

In an embodiment, at 312, the autonomous delivery controller obtains the order details from a transaction manager 124 that took the order from or located the order as a pre-staged order for the customer; the transaction manager 124 also confirming and identifying the designated location for the customer.

At 320, the autonomous delivery controller confirms items associated with the order details are loaded into a secure bin of the autonomous device 130.

In an embodiment, at 321, the autonomous delivery controller verifies the items are included in the order details and that there are no missing ordered items during loading of the items into the secure bin.

In an embodiment of 321 and at 322, the autonomous delivery controller scans item codes for each of the items as each item is loaded into the secure bin. Each scanned item code is matched, by the autonomous delivery controller, to a portion of the order details.

In an embodiment of 321 and at 323, the autonomous delivery controller performs image-based recognition on images of items as each item is loaded into the secure bin of the autonomous device 130. The autonomous delivery controller obtains item codes for each image based on the image-based recognition and matches each item code to a portion of the order details.

In an embodiment, at 324, the autonomous delivery controller locks the secure bin of the autonomous device 130 once each of the items is loaded into the secure bin and the order details comported with loaded items placed in the secure bin.

In an embodiment, the autonomous delivery controller receives a confirmation message from a remote system indicating that the items of the order are verified and loaded into the autonomous device as an indication that the autonomous delivery controller should initiate the autonomous device for autonomously traveling with the order to the designated location. In an embodiment, a staff-facing interface of a transaction terminal is used for providing the confirmation that the order details are loaded into the secure bin.

At 330, the autonomous delivery controller navigates the autonomous device 130 from its current location to the customer location.

In an embodiment, at 331, the autonomous delivery controller generates a navigation route from the current location of the autonomous device 130 to the designated location (which may be a current location of the customer, a fuel pump, or a predesignated location on a premises of an enterprise). The autonomous device then travels (autonomous moves) from the current location to the designated location in accordance with the route utilizing one or more of: a Global Positioning Satellite (GPS) receiver of the autonomous device and/or wireless location services of the autonomous device.

In an embodiment of 331 and at 332, the autonomous delivery controller generates an estimated time of arrival and communicates the estimated time of arrival to the customer. This can be done by sending an in-app message or text message to the user-operated device and/or by sending a message for display on a terminal where the customer is located (such as fuel pump 150 through the transaction interface 151). The estimated time of arrive is the estimated elapsed time or estimated specific time of day that the autonomous device will arrive at the designated location with the customer's ordered items. In an embodiment, a total time for the order may also be communicated to the customer, which includes the time the order was placed, the time the order was fulfilled, and the estimated time of arrival for the order to be delivered to the customer.

At 340, the autonomous delivery controller unlocks the secure bin of the autonomous device 130 allowing the customer to remove the items associated with the order for purposes of completing the order delivery to the customer.

In an embodiment, at 341, the autonomous delivery controller verifies an identity of the customer at the designated location before unlocking the secure bin of the autonomous device 130 at 340.

In an embodiment of 341 and at 342, the autonomous delivery controller takes an image of an identification card presented by the customer to the autonomous device's camera and the autonomous delivery controller validates identity information by performing image processing on the image. This may also be offloaded from the autonomous device's processor to a network-based image processing service to perform the image processing by the autonomous delivery controller.

In an embodiment of 341 and at 343, the autonomous delivery controller captures biometric data from the customer on the autonomous device 130 and validates the identity against registered biometric data that is registered to the customer. Any biometric-based or enabled device may be used and integrated into the autonomous device 130 for purposes of capturing the biometric data, such as a retina scanner, a fingerprint scanner, a camera, a microphone for a voice print, etc. Moreover, the registered biometric data may be associated with a hash value and the hash value provided by a network service to the autonomous delivery controller; the autonomous delivery controller using the same data points from the captured biometric data as that which is associated with the hash value, and the autonomous delivery controller performs a same hash function as that which was used to produce the original hash value. In this way, the generated hash value can be quickly and rapidly compared against the known hash value to perform identity validation on the customer at the designated location. This verification may also be offloaded from the autonomous device 130 to a network biometric validation service for customer identity validation.

FIG. 4 is a diagram of another method 400 for autonomous item delivery according to an example embodiment. The software module(s) that implements the method 400 is referred to as an "autonomous order-delivery manager." The autonomous order-delivery manager is implemented as executable instructions programmed and residing within memory and/or a non-transitory computer-readable (processor-readable) storage medium and executed by one or more processors of a device. The processors that execute the autonomous order-delivery manager are specifically configured and programmed to process the autonomous order-delivery manager. The autonomous order-delivery manager may have access to one or more network connections during its processing. The network connections can be wired, wireless, or a combination of wired and wireless.

In an embodiment, the device or devices that execute the autonomous order-delivery manager is the server 120, the fuel pumps 150, and/or the fulfillment transaction terminals 110. In an embodiment, the server 120 is a cloud processing environment, a LAN server, or a WAN server.

In an embodiment, the autonomous order-delivery manager is all of or some combination of: order manager 123, transaction manager 124, loyalty manager 125, promotion engine 126, autonomous device manager 127, fulfillment interface 111, and/or transaction/fuel interface 151.

The autonomous order-delivery manager interacts with the autonomous device 130 and the method 300 discussed above for purpose of sending instructions, orders, and location information to the autonomous device 130 and for purposes of receiving customer-provided information provided by customer to the autonomous device 130.

At 410, the autonomous order-delivery manager identifies a customer present at a pump location associated with a pump. The customer is at a convenience store refueling his/her vehicle at the pump.

In an embodiment, at 411, the autonomous order-delivery manager identifies the customer at the pump location based on one of: a card read by an interface of the pump (can be contacted based or contactless reading of the card), a code scanned by a customer-operated device that activates a mobile application of the user device and reports the pump location and customer identifier, a user device location reported from the mobile application of the user device, identifying information entered into a pump interface by the customer, and/or facial recognition performed on an image that is captured by a camera associated with the pump or associated with the customer-operated device (this may be the customer's mobile phone that includes an integrated camera and a mobile application that provides the captured image to the autonomous order-delivery manager for facial recognition of the customer.

At 420, the autonomous order-delivery manager obtains an order associated with the customer.

In an embodiment, at 421, the autonomous order-delivery manager obtains the order as one of: a pre-staged order that was provided by the customer before the customer arrived at the pump, a pump order that is entered into a pump interface of the pump by the customer, a mobile order that is entered into a mobile application interface of a mobile application on a customer-operated device, and/or a vehicle order that is entered into a vehicle interface of a vehicle when the customer is at the pump (while the customer is at the pump) or prior to the customer arriving at the pump as a pre-staged order (in an embodiment the vehicle interface is a voice-based interface where the customer uses natural language to communicate the order).

At 430, the autonomous order-delivery manager sends order details and the pump location for the pump where the customer is located to one or more fulfillment terminals 110.

At 440, the autonomous order-delivery manager initiates an autonomous device 130 with one or more items associated with the order details to autonomously navigate from an autonomous-device location to the pump location with the one or more items for delivery to the customer while the customer is at the pump.

In an embodiment, at 450, the autonomous order-delivery manager sends an electronic receipt for the order to a customer-operated device. This can be an in-app message or a text message that is sent as the receipt. The receipt may also be on a label that is affixed to the items (as discussed above). Moreover, the receipt details may be sent to a pump interface where the customer at the pump is asked whether the customer wants to print the receipt or not for the order.

In an embodiment, at 460, the autonomous order-delivery manager interacts with the autonomous device 130 to verify an identity of the customer when the autonomous device is at the pump location. This can be achieved in any of the above-mentioned manners, such as capturing an identification card for the customer, using biometric authentication, etc.

In an embodiment, at 470, the autonomous order-delivery manager processed payment for the order based on payment information collected by the autonomous device 130 and provided by the autonomous device 130 from the pump location to the autonomous order-delivery manager. Payment may also be automatically processed based on a registered payment method associated with a registered profile of the customer.

In an embodiment, the autonomous order-delivery manager processes a refund for any previously processed payment for the order when the autonomous device 130 reports the order was not delivered, was refused by the customer at the pump, or when the identity of the customer or age of the customer could not be validated or verified by the autonomous device 130.

In an embodiment, the autonomous device 130 interacts with the autonomous order-delivery manager to remove an item price from an order total price or credit a particular item price from a previously charged order total price. This allows the customer to refuse particular items associated with the order, such that the customer is only charged for the items that the customer took from the secure bin and not for the complete order total price.

Figure 5:
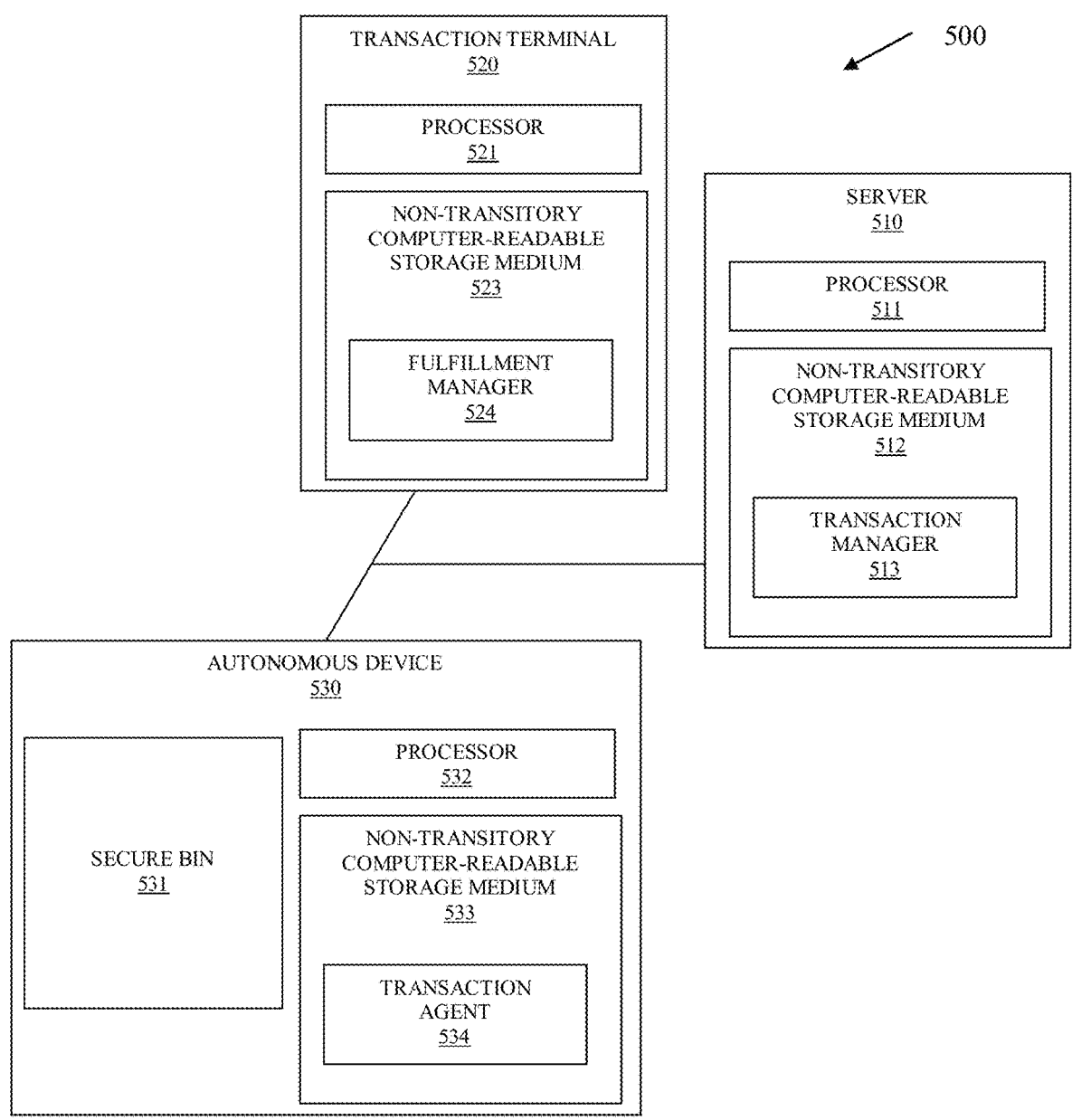
FIG. 5 is a diagram of another system for autonomous item delivery, according to an example embodiment.

FIG. 5 is a diagram of a system 500 for autonomous item delivery, according to an example embodiment. The system 500 includes a variety of hardware components and software components. The software components of the system 500 are programmed and reside within memory and/or a non-transitory computer-readable medium and execute on one or more processors of the system 500. The system 500 communicates over one or more networks, which can be wired, wireless, or a combination of wired and wireless.

In an embodiment, the system 500 implements, inter alia, the processing described above with the FIGS. 1-4.

The system 500 includes a server 510, a transaction terminal 520, and an autonomous device 530.

The server 510 includes a processor 511 and non-transitory computer-readable storage medium 512 having executable instructions representing a transaction manager 513. The transaction manager 513 when executed by the processor 511 from the non-transitory computer-readable storage medium 512 causes the processor 511 to: 1) identify a customer at a customer location; 2) obtain an order for the customer; and 3) send the customer location and order details for the order to the transaction terminal 520.

The transaction terminal 520 includes a processor 521 and non-transitory computer-readable storage medium 523 having executable instructions representing a fulfillment manager 524. The fulfillment manager 524 when executed by the processor 521 from the non-transitory computer-readable storage medium 523 causes the processor 521 to: 1) direct fulfillment of the order details; 2) provide the autonomous device 530 with the order details and the customer location; and 3) notify the autonomous device 530 when items associated with the order details are loaded into the secure bin 531 of the autonomous device 530.

The autonomous device 530 includes: a secure bin 531, a processor 532, and a non-transitory computer-readable storage medium 533 having executable instructions representing a transaction agent 534. The transaction agent 534 when executed by the processor 532 from the non-transitory computer-readable storage medium 533 causes the processor 533 to: 1) verify the items as the items are loaded into the secure bin 531 based on the order details; 2) lock the secure bin 531 upon notice once the items are loaded into the secure bin; 3) plan a navigation route from a current location to the customer location; 4) navigate from the current location to the customer location using the navigation route; 5) verify an identity of the customer at the customer location; and 6) unlock the secure bin 531 when the identity of the customer is verified to allow the customer to remove the items from the secure bin 531 at the customer location to fulfill the order.

In an embodiment, the customer location includes a fuel pump 150 having a transaction interface 151 where the customer is refueling a vehicle at the pump 150.

In an embodiment, the transaction manager 513 performs processing discussed above for all or some combination of: the order manager 123, the transaction manager 124, the loyalty manager 125, the promotion engine 126, the autonomous device manager 127, and/or the method 400.

In embodiment, the fulfillment manager 523 performs processing discussed above for all or some combination of: the fulfillment/transaction interfaces 111, the transaction interface 151, and/or the method 400.

In an embodiment, the transaction agent 534 performs processing discussed above for all or some combination of: the autonomous agent interface 131 and/or the method 300.

In an embodiment, the autonomous device 530 is an autonomous land-based robot or an autonomous air-based drone.

In an embodiment, the server 510 is a cloud-based server, a LAN-based server, or a WAN-based server.

In an embodiment, the transaction terminal 520 is a POS terminal, a SST, a kiosk, a digital sign with touchscreen interface, a fuel pump, and a mobile device operated by pickers or fulfillment personnel of an enterprise.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, by an autonomous device, order details for an order including a designated location where a customer associated with the order is to be delivered the order;
confirming, by the autonomous device, one or more items associated with the order details are loaded into a secure bin of the autonomous device by the autonomous device scanning a Quick Response (QR) code that identifies the customer, the items, and the designated location and confirming, by the autonomous device, the order details are correct, as each item is loaded into the secure bin of the autonomous device by the autonomous device scanning each label of each item being loaded and matching a corresponding item to the order details identified in the QR code;
navigating, by the autonomous device from a current location to the designated location;
verifying, by the autonomous device, an identity of the customer at the designated location; and
unlocking, by the autonomous device, the secure bin responsive at least in part to verifying the identity of the customer.

2. The method of claim 1, wherein receiving further comprises obtaining the order details from a transaction manager that received the order from the customer and that confirmed the designated location.

3. The method of claim 1, wherein confirming further comprises verifying the one or more items are included in the order details and that each item from the order details is loaded into the secure bin.

4. The method of claim 1, wherein confirming further comprises performing image-based recognition on images of the one or more items as each item is loaded into the secure bin, obtaining at least one item code for each image based on the performing, and matching each item code to a portion of the order details.

5. The method of claim 1, wherein confirming further comprises verifying, by the autonomous device as the one or more items are loaded into the secure bin based on the order details.

6. The method of claim 1, wherein navigating further comprises generating a navigation route from the current location to the designated location and traveling by the autonomous device from the current location to the designated location in accordance with the navigation route utilizing one or more of global positioning satellite (GPS) receivers and wireless location services of the autonomous device.

7. The method of claim 6, wherein generating further comprises generating an estimated time of arrival to arrive at the designated location and communicating the estimated time of arrival to the customer.

8. The method of claim 1, wherein verifying further comprises taking an image of an identification card presented by the customer to the autonomous device and validating identity information by performing image processing on the image.

9. The method of claim 1, wherein verifying further comprises capturing biometric data from the customer on the autonomous device and validating the identity against registered biometric data that is registered to the customer.

10. The method of claim 1, wherein the designated location changes as a customer location changes based on mobile device location information dynamically reported by a mobile device to the autonomous device.

11. The method of claim 1, wherein the autonomous device is an autonomous land-based robot or an autonomous air-based drone.

12. A method, comprising:
receiving, by an autonomous delivery device, order details for an order including a designated location where one or more items associated with the order are to be delivered;
verifying, by the autonomous delivery device, the one or more items as the one or more items are loaded into a secure bin of the autonomous delivery device by comparing each loaded item against the order details;
locking, by the autonomous delivery device, the secure bin upon verification that each of the one or more items from the order details are loaded;
planning, by the autonomous delivery device, a navigation route from a current location to the designated location;
navigating, by the autonomous delivery device, from the current location to the designated location using the navigation route;
verifying, by the autonomous delivery device, the one or more items as the one or more items are loaded into a secure bin of the autonomous delivery device by the autonomous delivery device scanning a Quick Response (QR) code that identifies a customer, the one or more items, and the designated location and confirming, by the autonomous delivery device, the order details are correct, as each item is loaded into the secure bin of the autonomous delivery device by the autonomous delivery device scanning each label of each item being loaded and matching a corresponding item to the order details identified in the QR code; and
unlocking, by the autonomous delivery device, the secure bin when an identity of the customer is verified to allow removal of the one or more items from the secure bin.

13. The method of claim 12, wherein verifying further comprises:
performing image-based recognition on images of the one or more items as each item is loaded into the secure bin;
obtaining one or more item identifiers from the images; and
matching each item identifier to a portion of the order details.

14. The method of claim 12, wherein planning comprises:
generating an estimated time of arrival to reach the designated location; and causing transmission of the estimated time of arrival to a customer device.

15. The method of claim 12, wherein verifying comprises:

capturing biometric data from the customer using one or more biometric sensors of the autonomous delivery device; and validating captured biometric data against registered biometric data associated with the customer.

16. The method of claim 12, wherein the designated location dynamically changes based on location information received from a mobile device associated with the customer.

17. The method of claim 12 further comprising:

receiving payment information through a payment interface of the autonomous delivery device; and processing payment for the order using received payment information.

18. The method of claim 12, wherein the autonomous delivery device comprises at least one of:

one or more motion sensors for detecting obstacles during navigation;

one or more light sensors for environmental awareness;

one or more sound sensors for environmental monitoring; and a camera system for capturing images during transit.

19. An autonomous delivery device, comprising:

a secure bin configured to be locked and unlocked;

a camera;

a processor; and a non-transitory computer-readable storage medium having executable instructions representing a transaction agent, wherein the transaction agent when executed by the processor is configured to cause the processor to:

receive order details for an order including a designated location where one or more items associated with the order are to be delivered to a customer;

verify the one or more items as the one or more items are loaded into the secure bin by scanning a Quick Response (QR) code that identifies the customer, the one or more items, and the designated location using the camera and confirming the order details are correct, as each item is loaded into the secure bin by scanning each label of each item being loaded using the camera and matching a corresponding item to the order details identified in the QR code;

lock the secure bin upon verification that each of the one or more items from the order details are loaded;

plan a navigation route from a current location of the autonomous delivery device to the designated location;

navigate the autonomous delivery device from the current location to the designated location using the navigation route;

verify an identity of the customer at the designated location; and unlock the secure bin when the identity of the customer is verified to allow the customer to remove the one or more items from the secure bin at the designated location to fulfill the order.

20. The autonomous delivery device of claim 19, wherein the autonomous delivery device is one of an autonomous land-based robot or an autonomous air-based drone.

* * * * *